Patented Oct. 19, 1954

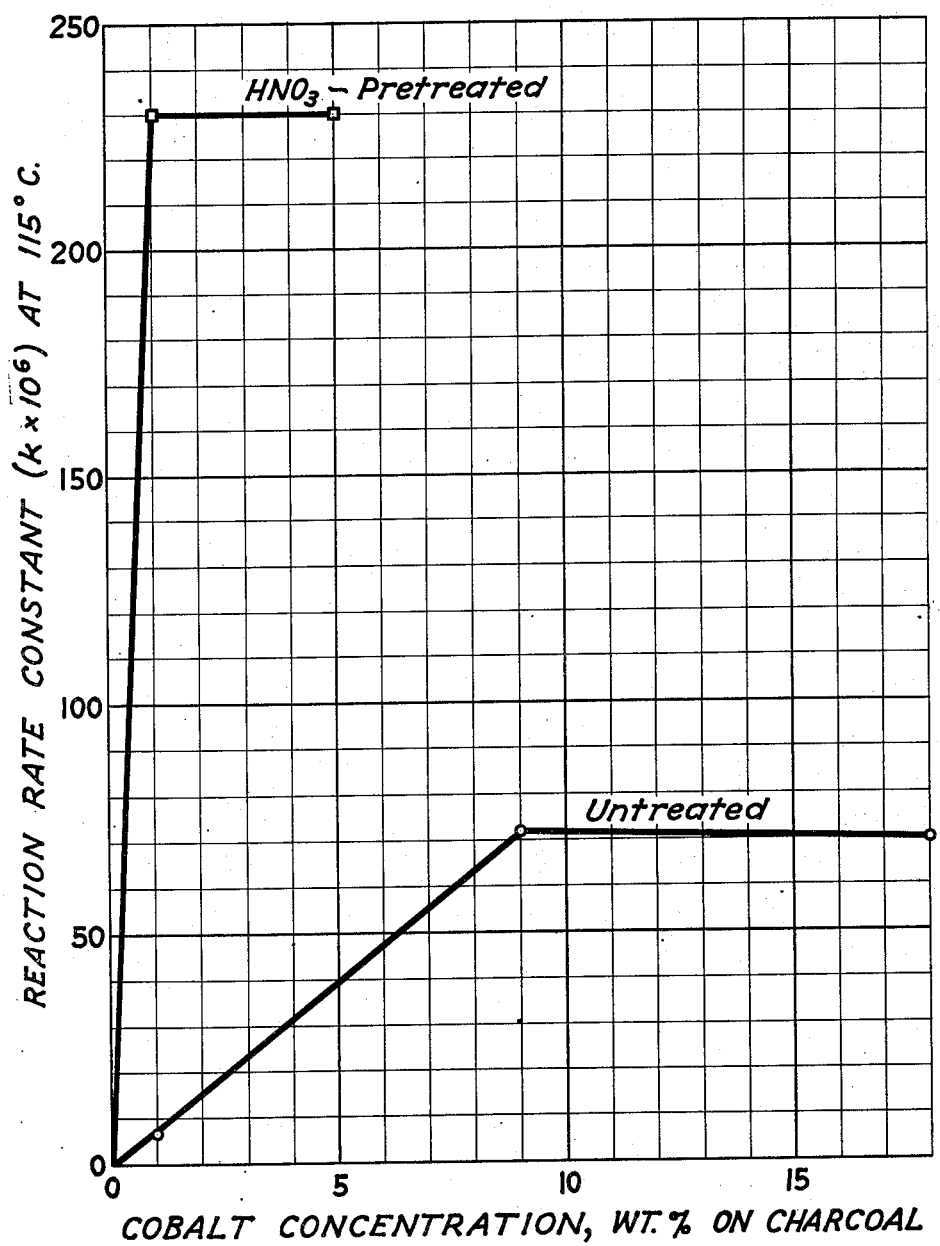

2,692,295

UNITED STATES PATENT OFFICE 2,692,295

POLYMERIZATION OF OLEFINS WITH CATALYST OF COBALT ON COCONUT CHARCOAL PRETREATED WITH NITRIC ACID

Edwin F. Peters, Chicago, Ill., assignor to Standard Oil Company, Chicago, Ill., a corporation of Indiana Application May 27, 1950, Serial No. 164,825

10 Claims. (Cl. 260—683.15)

This invention relates to a process for the polymerization of mono-olefinc gaseous hydrocarbons. More particularly, it relates to a process and especially active catalysts for the polymerization of normally gaseous, unbranched, mono-olefinic hydrocarbons. In one particular aspect, the present invention is concerned with a process for the conversion of ethylene principally into dimers, trimers and tetramers as a result of contact with cobalt supported upon an activated coconut charcoal which has been treated with nitric acid to eliminate nitric acid-soluble impurities from said charcoal.

The polymerization of normally gaseous olefins, particularly gaseous unbranched mono-olefins such as ethylene and propylene, has been a subject of relatively intensive development. Such processes and catalysts therefor have been disclosed, for example, in U. S. Patent 2,380,358 of John Andersen et al., patented July 10, 1945; U. S. Patents 2,407,813 and 2,407,814 of Harry A. Cheney, both patented September 17, 1946, and German Patent 559,736 of Carl Schuster, issued September 23, 1932. Although relatively satisfactory processes and catalysts for the polymerization of ethylene, propylene and the butylenes to produce principally $C_4$–$C_{10}$ hydrocarbon products have been developed, I have discovered a process and catalysts whereby the rate of olefin polymerization can be substantially increased, as will be set forth in detail hereinafter.

One object of my invention is to provide a process for the polymerization of normally gaseous unbranched mono-olefins at a high rate. Another object of my invention is to provide novel catalysts which exhibit extremely high activity for the polymerization of normally gaseous unbranched mono-olefins, particularly ethylene. Still another object of my invention is to provide the art with extremely active catalysts comprising essentially cobalt in combination with an activated charcoal, particularly an activated coconut charcoal. A further object of this invention is to provide a process for preparing highly active catalysts especially suitable for the polymerization of ethylene and other unbranched gaseous mono-olefins. These and other objects of my invention will become apparent from the ensuing description thereof.

Activated carbon is a unique support for eighth group metal catalysts, particularly cobalt and nickel, as regards the efficacy of the finished catalyst for the polymerization of normally gaseous, unbranched mono-olefins, particularly ethylene. Other porous materials such as diatomaceous earths, silica, alumina, celite, etc. do not appear to serve the same function as activated carbon and when said materials are used to support cobalt or nickel, the finished catalysts exhibit little or no activity in the polymerization of ethylene and similar olefins. Activated carbons as commercially produced are by no means pure carbon and contain quantities of non-carbon impurities usually varying between about 1 and about 5 percent by weight. The complete analysis of the impurities in activated carbons does not appear to have been made and, indeed, it is possible that only trace amounts of certain of these impurities would be sufficient substantially to reduce the activity of the carbon-supported catalysts for the polymerization of ethylene and the like. However, I have found that commercially activated carbon can be leached with nitric acid to remove nitric acid-soluble impurities therefrom and that catalysts prepared from the nitric acid-leached carbon are characterized by remarkably enhanced activity as compared with the conventionally prepared catalysts.

I usually employ activated carbons, particularly activated charcoals derived from cellulosic materials, having surface areas between about 700 and about 1200 m.$^2$/g., pore volumes of about 0.53 to 0.58 cc. per gram and pore diameters of about 20 to 30 Å, and, in some instances, small amounts of combined oxygen. When these activated carbons are covered with water and the mixture is stirred for some time at room temperature, the water leaches various materials therefrom and it often happens that the resultant aqueous solutions are slightly basic. Treatment with nitric acid neutralizes the basic materials in such carbons, particularly coconut charcoals. Nitric acid left upon the activated carbon after the treatment is removed by the application of heat to effect vaporization, or decomposition and vaporization. The nitric acid treatment of activated carbon causes some oxidation thereof. Details of suitable nitric acid treatments are set forth hereinafter.

The catalytic metal can be deposited upon the active carbon support by various methods well known in the art of catalyst preparation. Thus, the catalytic metal can be adsorbed upon the carbon in the form of a decomposable salt, e. g., in the form of nickel or cobalt nitrates, formates, carbonates, etc. I prefer to prepare the catalysts from nitrate salts. The adsorbed salt can be decomposed, preferably at reduced pressures between about 1 and about 20 mm. of mercury, to yield nickel or cobalt oxides upon and within the active carbon support, and the oxides can be reduced to the catalytically active metals by treatment with hydrogen. The salt of the catalytic metal can be adsorbed on the active carbon support in amounts sufficient to provide reduced catalytically active metal in concentrations between about .01 and about 20 percent by weight in the finished catalyst. Hydrogen reduction of the catalytic metal oxides can be effected at temperatures between about 200 and about 400° C. and hydrogen pressures between about 200 and about 2000 p. s. i. g.

As an alternative to adsorbing the catalytic metal upon the active carbon support in the form of a salt, use may be made of a readily decomposable compound such as a carbonyl, which can then be thermally decomposed to yield the catalytic metal. Even when nickel and cobalt catalysts are derived from the metal carbonyls, it is advisable to subject the catalysts to a treatment to remove carbon monoxide which has been adsorbed by the porous active carbon, e. g., to evacuation or to stripping with chemically inert gases such as nitrogen, at elevated temperatures between about 200 and about 400° C. Adsorbed carbon monoxide may be removed from the catalyst by treatment with hydrogen at 200° C. to 400° C. and hydrogen pressures of about 200 to about 2000 p. s. i. g.

In order to illustrate the present invention it will be described for the most part, specifically with reference to ethylene polymerization, although it should be understood that it is likewise applicable to the polymerization of propylene and unbranched butenes or to mixtures of two or more of these olefins. Briefly, the process of my invention comprises contacting a gas stream comprising essentially ethylene, which is substantially free of catalyst poisons or ethylene polymerization inhibitors, with a nitric acid-leached, activated carbon comprising essentially cobalt, although cobalt-nickel mixtures can be used. The contact of the ethylene feed stock with the catalyst is effected at temperatures between about 10 and about 200° C. at a weight space velocity between about 0.2 and about 2 grams of ethylene or other mono-olefinic feed stock per hour per gram of catalyst. The polymerization reaction pressure can vary from about 15 to about 20,000 p. s. i. g. or even higher. At polymerization pressures not in excess of about 500 p. s. i. g., the gaseous unbranched mono-olefins are converted predominantly to dimers, trimers and other polymers boiling substantially within the motor fuel boiling range, with little production of higher molecular weight polymers.

In the polymerization of ethylene at pressures of 500 p. s. i. g. or more, the polymerization products comprise predominantly motor fuel boiling range hydrocarbons and, in addition, appreciable amounts of normally solid ethylene polymerization products varying in nature from soft, grease-like hydrocarbon materials to tough, resinous, high molecular weight polyethylenes similar to the commercial polyethylene resins. When normally solid polyethylenes are produced in the present process, they are, for the most part, retained within and upon the porous catalyst mass, from which they may be recovered by solvent extraction operations.

As will appear from the data hereinafter supplied, the extremely active catalysts of the present invention lead to high rate ethylene polymerization even at pressures of 300 p. s. i. g. or less, whereas otherwise identical catalysts prepared from activated carbon which has not been subjected to nitric acid leaching induce ethylene polymerization only at extremely slow rates under the same conditions.

A variety of reaction systems can be employed for the practice of the present process. Thus, I may employ a moving bed system, similar to the moving bed systems currently employed in commercial catalytic cracking of hydrocarbon oils. In this type of operation, the ethylene-containing charging stock is introduced into the lower portion of a vertical tower against a downflow of fragments or pellets of the solid polymerization catalyst, suitably directed through the reactor by spaced baffles to provide extensive gas-solid contacting surface. Relatively low boiling ethylene polymerization products, together with unconverted ethylene, are withdrawn from the upper portion of the moving bed reaction zone. Catalyst is withdrawn from the lower end of the moving bed reaction zone, subjected to procedures for regenerating the catalyst (and for removal of the normally solid ethylene polymers, if any are present therein) and is then elevated to the upper portion of the moving bed reaction zone for recycle.

The present polymerization process may also be effected in reaction systems in which the catalyst is present in the form of a fluidized mass, particularly in the form of a fluidized fixed bed. Fluidized fixed bed reactors have been described in numerous patents and publications, for example in a publication by C. A. Thomas et al., Ind. Eng. Chem. 37, 332 (1945). In fluidized operations, powdered catalysts, usually varying in size between about 40 and 100 mesh, are employed and reaction gases are forced therethrough at a superficial linear velocity between about 0.5 and about 1.5 feet per second. The fluidized fixed bed operation presents the advantages of uniform heat distribution throughout the catalyst bed, ready heat removal from the catalyst bed and ready removal of catalyst from the reactor for separation of adsorbed normally solid ethylene polymers and/or regeneration, and recycle of spent catalyst.

A fixed bed reactor with either downflow or upflow of ethylene can be employed. The catalyst may be employed in the form of coarse fragments or pellets, e. g., as cylinders of about $\frac{1}{16}$ to $\frac{3}{4}$ inch length and $\frac{1}{16}$ to $\frac{3}{4}$ inch diameter. Parallel fixed bed reactors can be employed to obtain continuous operations, as in fixed bed hydrocarbon catalytic cracking units, one bed being dewaxed and/or regenerated while the other bed is on stream by suitable manual or automatic time-cycle valve operations to control the flow of ethylene, catalyst dewaxing solvent and regeneration gases to each bed of catalyst.

Carbon monoxide, hydrogen sulfide and ammonia function as catalyst poisons and should be removed from feed stocks in which they are present. Although carbon monoxide is quite readily removed by treating the catalyst with hydrogen, I have found that ammonia is very tenaciously adsorbed in the activated carbon-supported catalysts and is quite difficult to remove by high temperature (300–350° C.) hydrogen treating of the catalyst. Oxygen in relatively small proportions, up to 1000 to 2000 p. p. m., does not appear to exert a deleterious effect on the present ethylene polymerization process, although when the cumulative amount of oxygen charged to the catalyst is as high as about 3 mol percent based upon the metal content of the catalyst, substantial deactivation of the catalyst may occur. Commercial ethylene streams containing from about 100 to about 1000 parts per million of oxygen can, therefore, be employed without special deoxygenation treatment in the practice of the present invention. In peroxide-catalyzed processes for ethylene polymerization, amounts of oxygen within the range of 100 to 1000 p. p. m. in the ethylene feed stock are usually considered to exert a substantial deactivating effect. Ethane and other normally gaseous paraffin hydrocarbons in the ethylene charging stock function as diluents, but not as catalyst poisons and may therefore be present in the feed stock.

Various sources of ethylene, propylene and normal butylenes can be employed, for example fractions containing these gases produced from thermal or catalytic cracking or coking operations, carbon monoxide reduction processes and the like. Sulfur compounds, hydrogen, methane, CO, $CO_2$, $NH_3$ and the like may be removed from the gas streams by hypersorption, fractionation or sorption processes.

Catalysts were prepared, except as otherwise indicated, by adsorbing cobaltous nitrate hexahydrate on an activated coconut charcoal (Burrell) characterized by a surface area of about 1130 square meters per gram, a pore volume of about 0.59 cc. per gram and a pore diameter of about 21 Å. This activated coconut charcoal was found to contain very small proportions of sodium, potassium, chloride, phosphate and carbonate and chemically combined oxygen. When the charcoal is covered with water the resultant aqueous solution is slightly basic, having a pH of about 9. The activated coconut charcoal was found to contain no ammonia and only traces of heavy metals.

Prior to impregnating the coconut charcoal with cobalt nitrate it was leached with dilute nitric acid, employing for example, about 800 ml. of nitric acid per 500 ml. of charcoal. The nitric acid strength was between about 15 and about 20 weight percent and it was employed at about room temperature with a contacting period of about ½ hour. Contact of the activated coconut charcoal with dilute nitric acid results in a vigorous degassing (principally deaeration and the evolution of $CO_2$), followed by a small temperature rise and after a minute or two, the evolution of $NO_2$ fumes, which stops after a few minutes. After the spontaneous evolution of $NO_2$ has ceased the mixture can be heated up to about 60° C. without further evolution of $NO_2$. The charcoal was filtered from the spent nitric acid and dried on a hot plate. Between about 3 and about 8 weight percent of the activated coconut charcoal is extracted by the nitric acid treatment.

In general, I can employ aqueous nitric acid having a concentration between about 10 and about 40 weight percent in proportions between about 25 and about 75 percent by weight of the charcoal to be treated, at temperatures between about 20° C. and about 50° C.

In a typical instance in which 3.8 weight percent of solids were leached from the activated coconut charcoal by the nitric acid wash, a cation analysis of the leached solids was as follows:

| | |
|---|---|
| K | 23.70 |
| Ca | 6.25 |
| P | 1.66 |
| Mg | 1.45 |
| Si | 0.90 |
| Na | 0.59 |
| Fe | 0.25 |
| Al | 0.25 |
| Mn | 0. |
| Cu | 0.01 | being 35.26 weight per cent of the 3.8 weight per cent total.

In the preparation of the catalysts, an aqueous solution of the cobaltous nitrate was brought into contact with the nitric acid-leached activated coconut charcoal support and thereafter water was evaporated to yield the desired quantity of cobalt nitrate on the charcoal. Sufficient nitric acid must be present during the evaporation operation to prevent the formation of cobaltous hydroxide. The cobalt nitrate on the charcoal was thermally decomposed to yield the corresponding metal oxide under a reduced pressure between about 1 and about 20 mm. of mercury, absolute. The cobalt oxide on the active carbon was then reduced to the active metal by treatment with hydrogen at temperatures between about 250° C. and about 350° C. and pressures between about 900 and about 1500 p. s. i. g. The hydrogenation treatment must be thorough in order to achieve full reduction of the cobalt oxide to the active cobalt metal and for the further purpose of removing ammonia, which is produced by the reduction of small proportions of nitrate or $NO_2$ which are left in the catalyst, from the catalyst. The cobalt concentrations in the catalyst were varied. These catalysts were compared with catalysts otherwise similar or identical, prepared from conventionally activated coconut charcoal which had not been leached with nitric acid.

The catalysts were tested by adding a given amount of catalyst to a small reaction bomb, pressuring with ethylene and recording the drop of pressure with time. It was demonstrated that the drop in ethylene pressure coincided with the formation of ethylene polymers, comprising principally unbranched butenes, smaller proportions of hexenes and still smaller proportions of higher molecular weight ethylene polymers. It was observed that the reciprocal of the pressure could be plotted against reaction time as a linear function, showing that a second order reaction was occurring. The reaction rate constant of a second order reaction is $$K = \frac{1}{t} \cdot \frac{po - pt}{po \cdot pt}$$

in which $t$ is the time in minutes, $po$ is the original reaction pressure and $pt$ is the reaction pressure at time $t$, all pressures being expressed as pounds per square inch. It was thus possible to compare different catalysts by determining the reaction rate constants of the polymerization processes effected in their presence. Such a comparison is shown in the following table:

REACTION RATE CONSTANTS ($k \times 10^6$)

*Effect of increasing Co content with and without $HNO_3$ pretreatment*

WITHOUT $HNO_3$ PRETREATMENT

| Reaction Temp., °C. | Cobalt Content, wt. percent | | | |
|---|---|---|---|---|
| | 1 | 5 | 9 | 18 |
| 27 | | .24 | 4.9 | 5.0 |
| 115 | | 6.5 | .72 | 70 |

WITH $HNO_3$ PRETREATMENT

| | | | | |
|---|---|---|---|---|
| 115 | | 230 | 230 | |
| 122 | | 280 | | |

The data for runs made at 115° C. are graphically represented in the accompanying figure.

It will be noted that when activated carbon which has not been leached with nitric acid is employed as the catalyst support, the catalyst reaches full efficacy at about 9 weight percent of cobalt in the catalyst, since a further increase to 18 weight percent cobalt on the catalyst, at a given temperature, does not result in any further substantial increase in the reaction rate constant. It will further be evident from the above-tabulated data that when the activated carbon support is leached with nitric acid, the catalyst has already reached full efficacy at the low cobalt content of only 1 weight percent of the catalyst and that a further increase to 5 weight percent of cobalt on the nitric acid-leached charcoal results in the identical reaction rate constant. However, the catalyst containing 5% cobalt or more, for example 10 or 20% of cobalt, can be employed for longer runs before regeneration is necessary. Also noteworthy is the fact that nitric acid-treated catalyst containing only 1 percent of cobalt was about 50 times as active as unleached catalyst containing the same weight percent of cobalt, at the same temperature (115° C.).

Typical polymers of ethylene produced in the presence of nitric acid-treated charcoal-cobalt catalysts consist of 60 percent butenes, 24 percent hexenes, 9 percent octenes, 5 percent decenes and 2 percent of higher boiling products. The products all appear to be multiples of the ethylene molecule, indicating that no cracking or hydrogen disproportionation accompanies ethylene polymerization in the present process. The butenes consist of about 67 percent of 2-butene and 33 percent of 1-butene, with no evidence of isobutene. The hexenes were 30 percent of 3-methylpentenes and 70 percent of n-hexenes. The $C_8$ fraction was principally of unbranched structure.

The polymerization rate $(k \times 10^6)$ of propylene over the 1% cobalt nitric acid-treated-carbon catalyst used for ethylene polymerization was 3.1 at 115° C.

A catalyst of 1 weight percent nickel on an activated coconut charcoal which had been leached with nitric acid was prepared by the same technique as the 1 percent cobalt-nitric acid leached activated coconut charcoal. In the polymerization of ethylene over this nickel catalyst the reaction rate constant was $3.7 \times 10^{-6}$ at 122° C. as compared with the value of $2.8 \times 10^{-4}$ obtained with the 1 percent cobalt catalyst. It will thus be apparent that at equal catalyst concentrations and at the same temperature, the cobalt catalyst was 75 times as active. However, nickel is quite active as regards the formation of normally solid ethylene polymerization products. Thus, in a batch autoclave operation employing 96 grams of 5 percent nickel on acid-treated coconut charcoal at 124° C. and initial ethylene pressure of 1240 p. s. i. g., it was found that the pressure dropped to 800 p. s. i. g. over the course of 25 minutes and that the sole recoverable product was 2.6 grams of a grease-like ethylene polymer.

A specific application of the present invention in which solid ethylene polymers were obtained with a cobalt-charcoal is the following:

A catalyst of 1 weight percent cobalt on activated coconut charcoal was prepared by charcoal adsorption of a suitable amount of cobaltous nitrate from aqueous solution, decomposition of the supported nitrate in a bomb under the pressure of 20 mm. of mercury and reduction of the resultant cobalt oxide-charcoal catalyst with hydrogen at 260° C. and 1500 p. s. i. g. hydrogen pressure. The charcoal was pretreated before the adsorption step by covering it with 15 percent nitric acid solution at room temperature to leach out acid-soluble impurities. The reactor employed was a static bomb. Ethylene was polymerized in a bomb containing 76 grams of 6–14 mesh catalyst at 121° C. and 560 p. s. i. g. initial ethylene pressure, which dropped to 150 p. s. i. g. after 60 minutes. The bomb was then repressured with ethylene and it was found that the pressure dropped from an initial value of 570 p. s. i. g. to 260 p. s. i. g. over a period of 1½ hours. Products boiling in the motor fuel range and lower were removed from the catalyst by vaporization and the catalyst was then extracted with boiling xylene to obtain 17 grams of solid polyethylenes, which were separated from the xylene solution by cooling to room temperature and filtering. There were produced 5 grams of wax-like polyethylene having a melting point of 110° C., a softening point of 96–7° C. and a specific viscosity of 1800. Evaporation of the filtrate yielded 12 grams of a grease-like polyethylene having a melting point below 50° C. and a molecular weight of 370.

Having thus described my invention, what I claim is:

1. A process for the polymerization of a normally gaseous unbranched mono-olefin, which process comprises contacting said mono-olefin under polymerization conditions of temperature and pressure with a catalyst comprising essentially cobalt supported on an activated coconut charcoal which has been treated with nitric acid to remove a substantial proportion of nitric acid-soluble impurities from said charcoal.

2. The process of claim 1 wherein the proportion of said nitric acid-soluble impurities which are removed is between about 1 and about 5 percent by weight of said charcoal.

3. The process of claim 1 wherein said activated coconut charcoal has been subjected to contact with between about 25 and about 75 weight percent of aqueous nitric acid having a concentration between about 10 and about 40 weight percent at a temperature between about 20 and about 50° C. in order substantially to reduce the content of nitric acid-soluble impurities in said charcoal.

4. A process for the polymerization of ethylene, which process comprises contacting ethylene under polymerization conditions of temperature and pressure with a catalyst comprising essentially between about 0.01 and about 5 percent by weight of cobalt on an activated coconut charcoal which has been treated with nitric acid to remove a substantial proportion of nitric acid-soluble impurities from said charcoal.

5. A process for the polymerization of ethylene, which process comprises contacting ethylene under polymerization conditions of temperature and pressure with a catalyst comprising essentially cobalt supported on an activated coconut charcoal which has been subjected to contact with between about 25 and about 75 weight percent of aqueous nitric acid having a concentration between about 10 and about 40 weight percent at a temperature between about 20 and about 50° C. in order substantially to reduce the content of nitric acid-soluble impurities in said charcoal.

6. A process for the polymerization of ethylene, which process comprises contacting ethylene at a temperature between about 15° C. and about 175° C. and a pressure between about 15 and about 300 p. s. i. g. with a catalyst comprising essentially between about 0.01 and about 5 percent by weight of cobalt on an activated coconut charcoal which has been treated with between about 25 and about 75 weight percent of aqueous nitric acid having a concentration between about 10 and about 40 weight percent at a temperature between about 20 and about 50° C. in order substantially to reduce the content of nitric acid-soluble impurities in said charcoal.

7. A process for the polymerization of a normally gaseous unbranched mono-olefin, which process comprises contacting said mono-olefin at a temperature between about 15° C. and about 175° C. and a pressure between about 15 and about 20,000 p. s. i. g. with a catalyst comprising essentially cobalt on an activated coconut charcoal, said catalyst containing between about 0.01 and about 20 percent by weight of cobalt, said charcoal having been treated with between about 25 and about 75 weight percent of aqueous nitric acid having a concentration between about 10 and about 40 weight percent at a temperature between about 20° C. and about 50° C. prior to the deposition of cobalt thereon.

8. The process of claim 7 wherein said mono-olefin is ethylene.

9. The process of claim 1 wherein said mono-olefin is ethylene.

10. The process of claim 1 wherein said mono-olefin is propylene.

References Cited in the file of this patent

UNITED STATES PATENTS

| Number | Name | Date |
|---|---|---|
| 1,088,673 | Ellis | Feb. 24, 1914 |
| 1,156,674 | Ellis | Oct. 12, 1915 |
| 2,300,600 | Steely et al. | Nov. 3, 1942 |
| 2,407,813 | Cheney | Sept. 17, 1946 |
| 2,460,303 | McAllister et al. | Feb. 1, 1949 |